(12) United States Patent
Deng et al.

(10) Patent No.: US 11,282,498 B2
(45) Date of Patent: Mar. 22, 2022

(54) SPEECH SYNTHESIS METHOD AND SPEECH SYNTHESIS APPARATUS

(71) Applicant: Huawei Technologies Co., Ltd., Shenzhen (CN)

(72) Inventors: Liqun Deng, Shenzhen (CN); Yuezhi Hu, Beijing (CN); Zhanlei Yang, Beijing (CN); Wenhua Sun, Leuven (BE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/944,863

(22) Filed: Jul. 31, 2020

(65) Prior Publication Data

US 2020/0357383 A1 Nov. 12, 2020

Related U.S. Application Data

(63) Continuation of application No. PCT/CN2019/091844, filed on Jun. 19, 2019.

(30) Foreign Application Priority Data

Nov. 15, 2018 (CN) .......................... 201811360232.2

(51) Int. Cl.
*G10L 15/22* (2006.01)
*G10L 13/10* (2013.01)
*G10L 13/047* (2013.01)

(52) U.S. Cl.
CPC ............ *G10L 13/10* (2013.01); *G10L 13/047* (2013.01)

(58) Field of Classification Search
CPC ......... G10L 13/00; G10L 13/02; G10L 13/10; G10L 15/22; G10L 25/63
See application file for complete search history.

(56) References Cited

U.S. PATENT DOCUMENTS 8,185,395 B2* 5/2012 Ariyoshi ............... G10L 13/033
704/260
9,824,681 B2* 11/2017 Luan ..................... G10L 13/027
(Continued)

FOREIGN PATENT DOCUMENTS

CN 101661569 A 3/2010
CN 102385858 A 3/2012
(Continued)

OTHER PUBLICATIONS

Xiaolian Zhu, et al., "Controlling Expressivity using Input Codes in Neural Network based TTs," In Proceedings of ACII Asia, 2018, 6 pages.
(Continued)

*Primary Examiner* — Shreyans A Patel
(74) *Attorney, Agent, or Firm* — Conley Rose, P.C.

(57) ABSTRACT

A speech synthesis method and a speech synthesis apparatus to synthesize speeches of different emotional intensities in the field of artificial intelligence, where the method includes obtaining a target emotional type and a target emotional intensity parameter that correspond to an input text, determining a corresponding target emotional acoustic model based on the target emotional type and the target emotional intensity parameter, inputting a text feature of the input text into the target emotional acoustic model to obtain an acoustic feature of the input text, and synthesizing a target emotional speech based on the acoustic feature of the input text.

20 Claims, 4 Drawing Sheets

(56) References Cited

U.S. PATENT DOCUMENTS

| | | | |
|---|---|---|---|
| 10,140,972 B2* | 11/2018 | Chen | G10L 13/08 |
| 2004/0019484 A1* | 1/2004 | Kobayashi | G10L 13/02 |
| | | | 704/258 |
| 2009/0234652 A1* | 9/2009 | Kato | G10L 13/033 |
| | | | 704/260 |
| 2012/0078607 A1 | 3/2012 | Sumita | |
| 2013/0035940 A1* | 2/2013 | Wan | G10L 21/0364 |
| | | | 704/258 |
| 2013/0054244 A1 | 2/2013 | Bao et al. | |
| 2016/0071510 A1 | 3/2016 | Li et al. | |
| 2016/0329043 A1* | 11/2016 | Kim | G06F 3/167 |
| 2019/0172443 A1* | 6/2019 | Shechtman | G10L 13/10 |
| 2020/0357383 A1* | 11/2020 | Deng | G10L 13/047 |

FOREIGN PATENT DOCUMENTS

| | | |
|---|---|---|
| CN | 106531150 A | 3/2017 |
| CN | 106653000 A | 5/2017 |

OTHER PUBLICATIONS

Pawel Swietojanski, et al., "Learning hidden unit contributions for unsupervised speaker adaptation of neural network acoustic models," in Proc. IEEE Spoken Language Technology Workshop, 2014, pp. 171-176.

Heiga Zen, et al.,. "Statistical parametric speech synthesis," Speech Communication 51.11 (2009): 1039-1064.

Zen, Heiga et al,. "Statistical parametric speech synthesis using deep neural networks," Acoustics, Speech and Signal Processing (ICASSP), 2013 IEEE International Conference on. IEEE, 2013, pp. 7962-7966.

* cited by examiner

SPEECH SYNTHESIS METHOD AND SPEECH SYNTHESIS APPARATUS

CROSS-REFERENCE TO RELATED APPLICATIONS

This application is a continuation of International Patent Application No. PCT/CN2019/091844 filed on Jun. 19, 2019, which claims priority to Chinese Patent Application No. 201811360232.2 filed on Nov. 15, 2018. The disclosures of the aforementioned applications are hereby incorporated by reference in their entireties.

TECHNICAL FIELD

This application relates to the field of artificial intelligence, and in particular, to a speech synthesis method and a speech synthesis apparatus.

BACKGROUND

At present, speech synthesis technologies are widely used in many fields, such as the field of smart mobile terminals, the field of smart homes and the field of vehicle-mounted devices. Increasingly high speech quality requirements are imposed on speech synthesis. A requirement on speech quality is far more than "being heard clearly", and rather higher quality like "highly realistic and emotional" is required.

Synthesis of "highly realistic and emotional" speeches is a great challenge to current speech synthesis technologies. In conventional speech synthesis technologies, an emotional mark is added to a text, and the text is synthesized into a speech of a corresponding emotional type merely based on the emotional mark, without considering an emotional intensity factor. As a result, the synthesized speech is not rich in emotional expressions. Only emotions such as "happiness" and "sadness" can be expressed, and an emotional intensity of speeches cannot be controlled, making the speeches less realistic and less emotional.

SUMMARY

Embodiments of this application provide a speech synthesis method and a speech synthesis apparatus, to synthesize emotional speeches corresponding to emotional types of different emotional intensities, making the emotional speeches more realistic and rich in emotional expressions.

To achieve the foregoing technical objectives, the following technical solutions are provided in the embodiments of this application.

According to a first aspect, an embodiment of this application provides a speech synthesis method, including obtaining a target emotional type and a target emotional intensity parameter of an input text, where the target emotional intensity parameter is used to represent an emotional intensity corresponding to the target emotional type, obtaining a target emotional acoustic model corresponding to the target emotional type and the target emotional intensity parameter, inputting a text feature of the input text into the target emotional acoustic model to obtain an acoustic feature of the input text, and synthesizing a target emotional speech based on the acoustic feature of the input text. It is easy to understand that the target emotional acoustic model is an acoustic model obtained through model training for the target emotional type and the emotional intensity corresponding to the target emotional type, and the acoustic feature corresponding to the input text is obtained based on the target emotional acoustic model, and finally, the acoustic feature is synthesized into the corresponding target emotional speech.

It can be learned from the foregoing technical solution that the technical solution of this application has the following advantages. The text feature of the input text is converted into the acoustic feature using the target emotional acoustic model corresponding to the target emotional type and the emotional intensity of the target emotional type, and finally the acoustic feature is synthesized into the target emotional speech. Because the target emotional acoustic model is obtained based on the target emotional type and the emotional intensity of the target emotional type, the acoustic feature related to the emotional intensity of the emotional type can be obtained using the target emotional acoustic model, to synthesize speeches of different emotional types and different emotional intensities, improving diversity of synthetic speeches in emotional expressions.

Optionally, with reference to the first aspect, in a first possible implementation of the first aspect of the embodiment of this application, obtaining a target emotional type and a target emotional intensity parameter of an input text includes determining the target emotional type of the input text based on an emotional label of the input text, where the emotional label is used to represent the emotional type of the input text, and determining the target emotional intensity parameter based on an emotional intensity requirement corresponding to the input text. Optionally, the emotional intensity requirement is specified by a user.

Optionally, with reference to the first aspect or the first possible implementation of the first aspect, in a second possible implementation of the first aspect of the embodiment of this application, obtaining a target emotional acoustic model corresponding to the target emotional type and the target emotional intensity parameter includes selecting, from an emotional acoustic model set, an emotional acoustic model corresponding to the target emotional type and the target emotional intensity parameter as the target emotional acoustic model, where the emotional acoustic model set includes a plurality of emotional acoustic models, and the plurality of emotional acoustic models include the target emotional acoustic model.

Optionally, with reference to the second possible implementation of the first aspect, in a third possible implementation of the first aspect of the embodiment of this application, before obtaining a target emotional acoustic model corresponding to the target emotional type and the target emotional intensity parameter, the method further includes performing, for different emotional types and different emotional intensity parameters corresponding to the emotional types, model training using a neutral acoustic model and corresponding emotional speech training data to obtain the emotional acoustic model set, where the emotional speech training data is data with emotions corresponding to one or more emotional types, and the neutral acoustic model is obtained through model training using neutral speech training data, where the neutral speech training data is data without any emotion corresponding to any emotional type.

Optionally, with reference to the third possible implementation of the first aspect, in a fourth possible implementation of the first aspect of the embodiment of this application, an acoustic feature training error corresponding to the emotional speech training data is related to the target emotional intensity parameter, where the acoustic feature training error corresponding to the emotional speech training data is used to represent an acoustic feature loss of an acoustic feature predicted using the emotional speech training data during the model training relative to an original acoustic feature of the emotional speech training data.

Optionally, with reference to the fourth possible implementation of the first aspect, in a fifth possible implementation of the first aspect of the embodiment of this application, that the acoustic feature training error corresponding to the emotional speech training data is related to the target emotional intensity parameter may be reflected in that the acoustic feature training error is calculated using an error calculation formula, and the error calculation formula is:

$$\text{loss}=0.5\times(y2-\beta*y1-(1-\beta)*y)^2,$$

where loss is the acoustic feature training error, $\beta$ is the emotional intensity parameter, y1 is an acoustic feature parameter predicted using the emotional speech training data in the neutral acoustic model, y2 is an acoustic feature parameter predicted using the emotional speech training data in the target emotional acoustic model, and y is an original acoustic feature parameter of the emotional speech training data.

Optionally, with reference to the third possible implementation to the fifth possible implementation of the first aspect, in a sixth possible implementation of the first aspect of the embodiment of this application, both the neutral acoustic model and the emotional acoustic model may be constructed based on a hidden Markov model or a deep neural network model.

Optionally, with reference to the first aspect or any one of the first possible implementation of the first aspect to the fifth possible implementation of the first aspect, in a sixth possible implementation of the first aspect of the embodiment of this application, the text feature includes a feature corresponding to at least one of a phoneme, a syllable, a word, or a prosodic phrase that corresponds to the text, and the acoustic feature includes at least one of a fundamental frequency feature, a line spectrum pair feature, a voiceless/voiced sound flag feature, or a spectral envelope feature that corresponds to a sound.

According to a second aspect, an embodiment of this application provides a speech synthesis apparatus, where the speech synthesis apparatus has a function of implementing the method in the first aspect or any one of the possible implementations of the first aspect. The function may be implemented by hardware, or implemented by hardware by executing corresponding software. The hardware or the software includes one or more modules corresponding to the foregoing function.

According to a third aspect, an embodiment of this application provides a speech synthesis apparatus, including a processor and a memory, where the memory is configured to store computer executable instructions, and when the speech synthesis apparatus runs, the processor executes the computer executable instructions stored in the memory such that the enforcement function network element performs the speech synthesis method in the first aspect or any one of the possible implementations of the first aspect.

According to a fourth aspect, an embodiment of this application provides a computer readable storage medium, where the computer readable storage medium includes instructions, and when the instructions are run on a computer, the computer is enabled to perform the speech synthesis method in the first aspect or any one of the possible implementations of the first aspect.

According to a fifth aspect, an embodiment of this application provides a computer program product including computer operation instructions, and when the computer program product is run on a computer, the computer is enabled to perform the speech synthesis method in the first aspect or any one of the possible implementations of the first aspect.

According to a sixth aspect, an embodiment of this application provides a chip system, where the chip system includes a processor configured to support a speech synthesis apparatus in implementing a function in the first aspect or any one of the possible implementations of the first aspect. In a possible design, the chip system further includes a memory, where the memory is configured to store program instructions and data that are necessary for a control function network element. The chip system may include a chip, or may include a chip and another discrete device.

According to a seventh aspect, an embodiment of this application provides an emotional model training method, where the emotional model training method may be applied to the training of the emotional acoustic model in the first aspect, and the specific training method includes obtaining an emotional acoustic model based on a hidden Markov model or a deep neural network model, using a final model parameter of a neutral acoustic model as an initialized model parameter of the emotional acoustic model, inputting a text feature corresponding to an emotion type of "happiness" and an emotional intensity 0.5 of "happiness" into an initialized emotional acoustic model of "happiness", calculating a training error of an acoustic feature corresponding to the text feature based on the emotional intensity parameter of 0.5, and when the training error is greater than a preset error, performing iterative computation until the training error is less than or equal to the preset error, and then using, as the final model parameter of the emotional acoustic model of "happiness", a corresponding model parameter obtained when the training error is less than or equal to the preset error, to complete training on the emotional acoustic model of "happiness".

Similarly, based on the foregoing emotional model training method, emotional acoustic models of "happiness" corresponding to other emotional intensity parameters (such as 0.1, 0.2, 0.3, 0.4, 0.6, 0.7, 0.8, 0.9, and 1) of the emotion type "happiness" can be obtained through training. Further, emotional acoustic models of other emotional types, for example, an emotional acoustic model of "sadness", an emotional acoustic model of "surprise", and an emotional acoustic model of "fear", can also be obtained using the foregoing emotional model training method. Finally, emotional acoustic models corresponding to various emotional types and emotional intensity parameters of the emotional types are composed into an emotional acoustic model set.

Optionally, training on the neutral acoustic model is performed in a way similar to the training on the emotional acoustic model of "happiness", and may be constructing the neutral acoustic model based on the hidden Markov model or the deep neural network model, initializing a model parameter corresponding to each neural network layer in the neutral acoustic model using a random value, further, after initializing the model parameter of the neutral acoustic model, inputting neutral speech training data without any emotional type into the neutral acoustic model for training, and using, as a final model parameter of the neutral acoustic model, a corresponding model parameter obtained when a training error is less than a preset error, to complete the training on the neutral acoustic model.

According to an eighth aspect, an embodiment of this application further provides an emotional model training apparatus, where the emotional model training apparatus has a function of implementing the method in the seventh aspect or any one of the possible implementations of the seventh aspect. The function may be implemented by hardware, or implemented by hardware by executing corresponding software. The hardware or the software includes one or more modules corresponding to the foregoing function.

For technical effects of any one of the implementations of the second aspect to the eighth aspect, refer to the technical effects of different implementations in the first aspect. Details are not described herein again.

DESCRIPTION OF EMBODIMENTS

Figure 1:
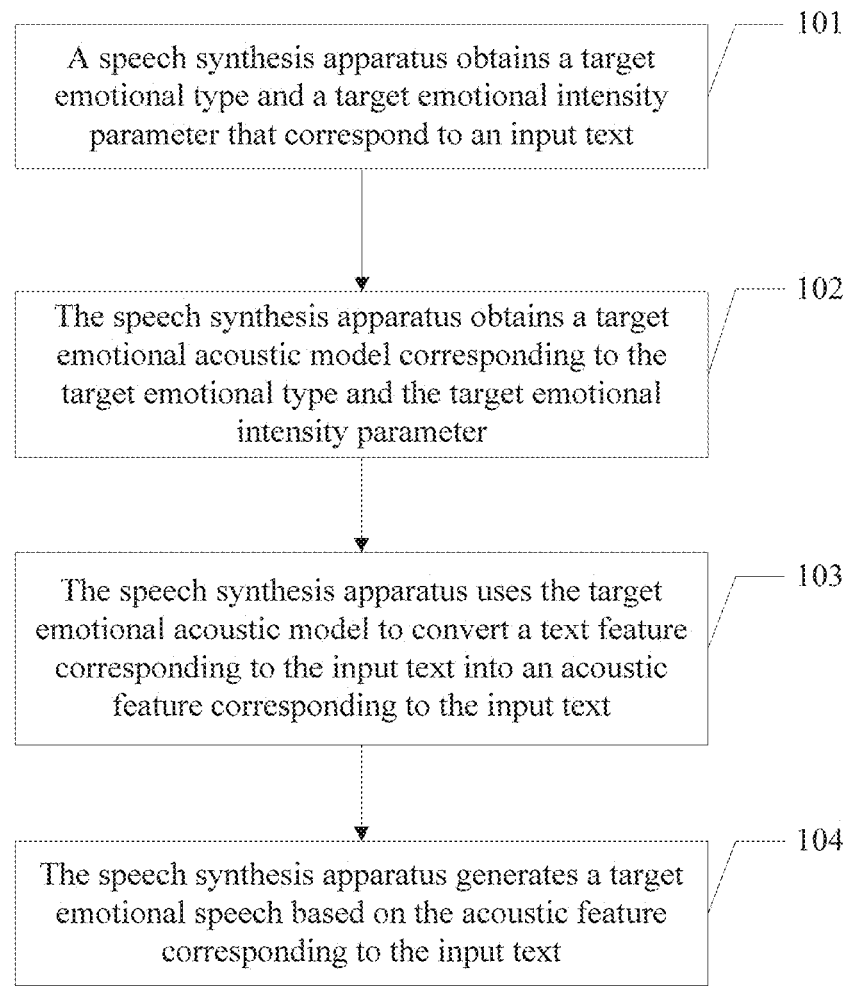
FIG. 1 is a schematic diagram of an embodiment of a speech synthesis method according to an embodiment of this application.

The following describes the embodiments of this application with reference to the accompanying drawings. The described embodiments are merely some but not all of the embodiments of this application. A person of ordinary skill may know that, with development of technologies and emergence of new scenarios, technical solutions provided in the embodiments of this application are also applicable to similar technical problems.

The embodiments of this application provide a speech synthesis method and a speech synthesis apparatus, to synthesize speeches of different emotional intensities, improving diversity of synthetic speeches in emotional expressions. Detailed descriptions are as follows.

The term "and/or" in this application describes only an association relationship for describing associated objects and represents that three relationships may exist. For example, A and/or B may represent the following three cases: only A exists, both A and B exist, and only B exists. In addition, the character "/" in this application generally indicates an "or" relationship between the associated objects.

In the specification, claims, and accompanying drawings of this application, the terms such as "first" and "second" are intended to distinguish between similar objects but do not necessarily indicate a specific order or sequence. It should be understood that the data used in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those modules, but may include other modules not expressly listed or inherent to such a process, method, system, product, or device. Names or numbers of steps in this application do not mean that the steps in a method process need to be performed according to a chronological/logical order indicated by the names or numbers. An execution sequence of the steps in the process that have been named or numbered may be changed based on technical objectives to be implemented, provided that a same or similar technical effect can be achieved. The module division in this application is merely logical function division and may be other division in actual application. For example, a plurality of modules may be combined or integrated into another system, or some features may be ignored or may not be performed. In addition, the displayed or discussed mutual couplings or direct couplings or communication connections may be implemented using some interfaces. The indirect couplings or communication connections between the modules may be implemented in electrical or other similar forms. This is not limited in this application. In addition, modules or sub-modules described as separate components may be or may not be physically separated, or may be or may not be physical modules, or may be grouped into a plurality of circuit modules. Objectives of the solutions of this application may be achieved by selecting some or all of the modules according to actual requirements.

The speech synthesis method proposed in the embodiments of this application may be applied to the field of smart mobile terminals, the field of smart homes, the field of vehicle-mounted devices, and the like. Further, the speech synthesis method in the embodiments of this application may be applied to entities with an emotional speech synthesis function, for example, a smartphone terminal, a smart speaker, a wearable smart device, a smart vehicle-mounted device, and an intelligent robot. The foregoing entities have an emotion analysis and processing capability and a speech synthesis capability.

For ease of understanding of the speech synthesis method described in the embodiments of this application, the following describes the speech synthesis method in detail with reference to the specific embodiments.

FIG. 1 is a schematic diagram of an embodiment of a speech synthesis method according to an embodiment of this application.

As shown in FIG. 1, the speech synthesis method in this embodiment of this application includes the following steps.

Step 101. A speech synthesis apparatus obtains a target emotional type and a target emotional intensity parameter that correspond to an input text.

An emotional type is an emotion classification determined based on such factors as a value subject type, a value-driven variable, and a value goal orientation, and an emotional intensity refers to a selective tendency of a person toward a thing, and is a most important dynamic characteristic of emotions. Further, emotional types may include "happiness", "sadness", "surprise", "fear", and so on, and a same emotional type may be expressed in different emotional intensities.

Optionally, the speech synthesis apparatus may determine a target emotional type and a target emotional intensity parameter of a synthetic speech based on an emotional label of the input text and an emotional intensity requirement of a user. The target emotional intensity parameter is an emotional mild parameter corresponding to the target emotional type, and the emotional intensity parameter is used to identify an emotional intensity. For example, the emotional intensity may be classified into 10 intensity grades, represented by emotional intensity parameters 0.1, 0.2, 0.3, . . . , 0.9, and 1 in ascending order of intensity grades.

For example, for an input text "tomorrow is the weekend, it is so happy", an emotion type of "happiness" is used for speech synthesis. The emotional type, that is, a "happiness" label, can be obtained in the following manners: (1) An emotional type specified by the user is determined as the target emotional type. For example, the user specifies emotional type information using a markup language, and may input the emotional type information using a corresponding speech synthesis (text to speech (TTS)) software program or a hardware device. (2) If no emotional type is specified by the user, the target emotional type may be obtained by performing emotion analysis on the input text. For example, the emotional type corresponding to the input text is obtained through analysis using an emotional type recognition model. The emotional intensity parameter can be obtained in the following manners: (3) An emotional intensity parameter value specified by the user is determined as the target emotional intensity parameter. For example, when inputting the input text, the user specifies the emotional intensity parameter corresponding to the input text. (4) The target emotional intensity parameter is determined based on a rough emotional intensity provided by the user, such as sub-mild, mild, moderate, severe, or ultra-severe. Further, emotional intensity parameters corresponding to sub-mild, mild, moderate, severe, and ultra-severe may be preset as 0.1, 0.2, 0.5, 0.7, and 0.9. (5) A default value is used as the target emotional intensity parameter. For example, when no value is specified, a default emotional intensity parameter value 0.5 is used as a target emotional intensity parameter corresponding to "happiness".

Step 102. The speech synthesis apparatus obtains a target emotional acoustic model corresponding to the target emotional type and the target emotional intensity parameter.

Emotional acoustic models are acoustic models corresponding to different emotional types and different emotional intensities of the emotional types. There are at least two emotional acoustic models. A specific quantity depends on a quantity of the emotional types and a quantity of emotional intensity grades of each emotional type. It is easy to understand that one emotional intensity parameter may correspond to one emotional intensity grade. For example, if the speech synthesis apparatus supports four emotional types: "happiness", "sadness", "surprise", and "fear", and like in step 101, each of the four emotional types is classified into 10 emotional intensity grades, then, there are a total of 40 emotional acoustic models in the speech synthesis apparatus.

Optionally, acoustic models corresponding to the emotional acoustic model and the neutral acoustic model may be constructed based on a hidden Markov model or a deep neural network model. Certainly, the acoustic models may be alternatively obtained through modeling based on another mathematical model with similar functions. This is not limited in this application.

Figure 2:
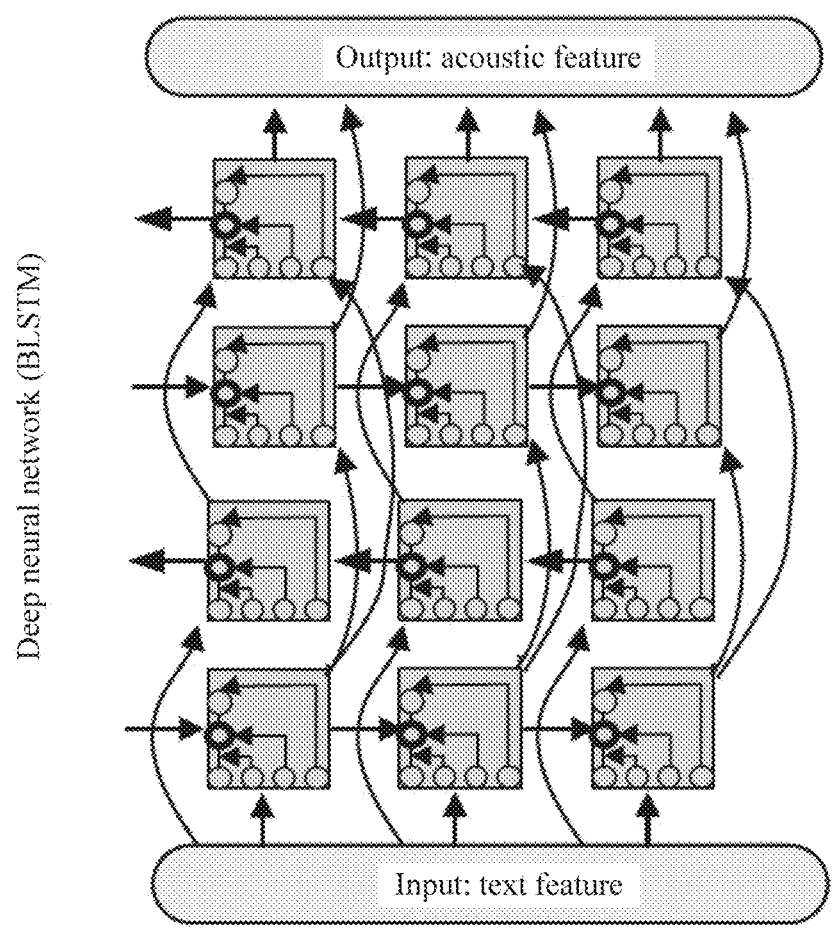
FIG. 2 is a schematic diagram of a deep neural network model according to an embodiment of this application.

FIG. 2 is a schematic diagram of a deep neural network model according to an embodiment of this application. As shown in FIG. 2, an acoustic model in this embodiment of this application may be constructed using a deep neural network, such as a bidirectional long short-term memory network (BLSTM). The BLSTM is a bidirectional time recursive neural network, and is a recurrent neural network model commonly used in the field of machine learning.

Optionally, that the speech synthesis apparatus obtains a target emotional acoustic model corresponding to the target emotional type and the target emotional intensity parameter may be selecting, from an emotional acoustic model set, an emotional acoustic model corresponding to the target emotional type and the target emotional intensity parameter as the target emotional acoustic model, where the emotional acoustic model set includes at least one emotional acoustic model, and the at least one emotional acoustic model includes the target emotional acoustic model.

Based on the selecting, from an emotional acoustic model set, an emotional acoustic model corresponding to the target emotional type and the target emotional intensity parameter as the target emotional acoustic model, further optionally, the speech synthesis apparatus performs, for different emotional types and different emotional intensity parameters, model training using a neutral acoustic model and corresponding emotional speech training data to obtain the emotional acoustic model set. The emotional speech training data is speech data with emotions corresponding to one or more emotional types, and the neutral acoustic model is obtained through model training using neutral speech training data, where the neutral speech training data is data without any emotion corresponding to any emotional type.

Figure 3:
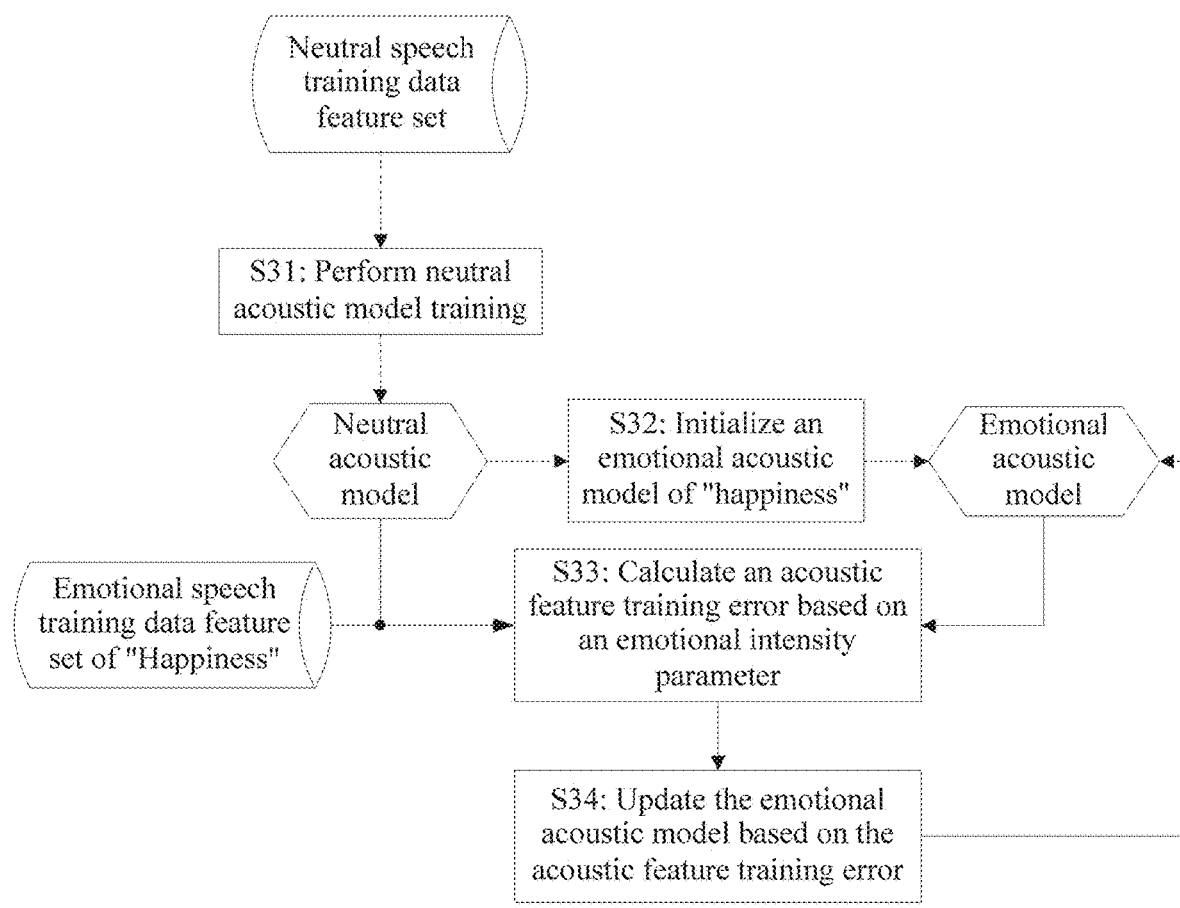
FIG. 3 is a schematic diagram of an adaptive training process of an emotional acoustic model according to an embodiment of this application.

Further, the emotional acoustic model may be obtained through adaptive training on the emotional acoustic model using emotional speech data, assisted by the neutral acoustic model. FIG. 3 is a schematic diagram of an adaptive training process of an emotional acoustic model according to an embodiment of this application. As shown in FIG. 3, training of an emotional acoustic model with a target emotional type of "happiness" and a target emotional intensity parameter of 0.6 is used as an example. A dotted arrow indicates a one-time operation, that is, an operation performed only once, and a solid arrow indicates multiple iteration cycle operations, that is, S31 and S32 need to be performed only once, while S33 and S34 are performed cyclically.

The emotional acoustic training process described in FIG. 3 includes the following steps.

Step S31. Perform neutral acoustic model training.

Step S32. Initialize the emotional acoustic model of "happiness".

Step S33. Calculate an acoustic feature training error based on an emotional intensity parameter.

Step S34. Update the emotional acoustic model based on the acoustic feature training error.

Steps S33 and S34 are performed cyclically, and how many times the steps are performed are determined by a quantity of iterations of the entire emotional acoustic model training and a data sample batch size for each calculation. To be specific, if a total quantity of training data samples is N. and a batch size for each calculation is 32, steps S33 and S34 need to be performed for (N/32) times in each iteration process, and if the entire training process ends after T iterations, steps S33 and S34 need to be performed for (T*N/32) times during the entire training. In addition, in the foregoing model training process, model training is performed for each emotional type and a corresponding emotional intensity, to obtain emotional acoustic models corresponding to different emotional types and different emotional intensity parameters of the emotional types.

In FIG. 3, training of a neutral acoustic model may be performed using the BLSTM model described in FIG. 2. Further, a text feature is input into the neutral acoustic model, where the text feature may be a neutral speech training data feature set. A model parameter value of the BLSTM model is initialized using a random value. Neutral speech training data is input in batches (for example, with 32 data samples as a batch) into the BLSTM model for training. A model parameter corresponding to each neural network layer in the BLSTM model is adjusted to continuously reduce an acoustic feature training error. Multiple rounds of iteration training are performed on the neutral speech training data until the quantity of iterations reaches a preset quantity or the acoustic feature training error reaches a predetermined value, and finally obtained model parameters are output as a target neutral model. In addition, a training manner of the emotional acoustic model is consistent with that of the neutral model, and a difference lies in that before training, the neutral acoustic model is initialized using a random value, while the emotional acoustic model is initialized using the model parameters corresponding to the target neutral acoustic model. An initialization operation of the emotional acoustic model may be sequentially assigning model parameters of each neural network layer in the target neutral acoustic model to corresponding parameters of each neural network layer in the emotional acoustic model.

It should be noted that FIG. 3 is only a schematic diagram of a training method of an acoustic model, and does not represent a specific implementation. Optionally, in specific implementation, the neutral speech training data feature set or the neutral speech training data may be input into the neutral acoustic model. When the neutral speech training data is input, in the neutral acoustic model training process in step S31, text feature extraction needs to be performed on the neutral speech training data to obtain the neutral speech training data feature set in order to continue the neutral model training process. Similarly, for emotional acoustic model training, emotional speech training data or an emotional speech training data feature set may be input.

Optionally, an acoustic feature training error corresponding to the emotional speech training data is related to the emotional intensity parameter, where the acoustic feature training error corresponding to the emotional speech training data is used to represent an acoustic feature loss of an acoustic feature predicted using the emotional speech training data during the model training relative to an original acoustic feature of the emotional speech training data. Specific descriptions are shown in step S33. Further optionally, the acoustic feature training error corresponding to the emotional speech training data may be calculated using an error calculation formula, and the error calculation formula is:

$$\text{loss}=0.5\times(y2-\beta*y1-(1-\beta)*y)^2,$$

where loss is the acoustic feature training error corresponding to the emotional speech training data, β is the emotional intensity parameter, y1 is an acoustic feature parameter predicted using the emotional speech training data in the neutral acoustic model, y2 is an acoustic feature parameter predicted using the emotional speech training data in the target emotional acoustic model, and y is an original acoustic feature parameter of the emotional speech training data. It should be noted that the foregoing error calculation formula is only used to describe a feasible calculation method that can be used to calculate the acoustic feature training error, and has no direct correspondence with the model training method shown in FIG. 3. Further, the foregoing error calculation formula or another error calculation formula may be used to calculate the acoustic feature training error in the model training method shown in FIG. 3. When the foregoing error calculation formula is used, the original acoustic feature parameter y of the emotional speech training data needs to be obtained in advance. A specific manner for obtaining the original acoustic feature parameter y is not limited in this embodiment of this application.

In this embodiment of this application, it should be noted that the acoustic feature training error may be calculated using the foregoing error calculation formula or other similar calculation formulas. This is not limited in this application.

Step 103. The speech synthesis apparatus uses the target emotional acoustic model to convert a text feature corresponding to the input text into an acoustic feature corresponding to the input text.

The text feature may include but is not limited to a feature corresponding to at least one of a phoneme, a syllable, a word, or a prosodic phrase that corresponds to the text, and the acoustic feature may include but is not limited to at least one of a fundamental frequency feature, a line spectrum pair feature, an voiceless/voiced sound flag feature, or a spectral envelope feature that corresponds to a sound.

Optionally, the speech synthesis method further includes performing, by the speech synthesis apparatus, a text analysis on the input text to determine the text feature corresponding to the input text.

The text analysis may include but is not limited to at least one of a text normalization operation, a word segmentation operation, a part-of-speech tagging operation, a grammatical analysis operation, a prosody prediction operation, a grapheme-to-phoneme conversion operation, or a duration information analysis operation.

The text normalization operation refers to converting non-Chinese characters in the text, such as Arabic numerals, English symbols, and various other symbols, into corresponding Chinese characters.

The word segmentation operation refers to dividing a string of consecutive Chinese characters in the text into sequences of words.

The part-of-speech tagging operation refers to tagging nouns, verbs, adjectives, and the like in the text.

The grammatical analysis operation refers to analyzing grammatical and semantic structures of each sentence in the text, determining a semantic center, and an accent placement and intonation of each sentence, to provide important information for the prosody prediction operation.

The prosody prediction operation refers to predicting prosody structures of different levels in each sentence corresponding to the text, such as prosody words, prosodic phrases, and intonation phrases.

The grapheme-to-phoneme conversion operation refers to converting Chinese characters into pinyin.

The duration information analysis operation refers to predicting duration information of syllables, initials, finals, phonemes, states, and the like in a speech.

Step 104. The speech synthesis apparatus generates a target emotional speech based on the acoustic feature corresponding to the input text.

A vocoder is used to synthesize the acoustic feature corresponding to the input text into the corresponding target emotional speech, where an emotional type of the target emotional speech is the target emotional type, and an emotional intensity value of the target emotional speech is equal to the value of the target emotional intensity parameter.

The vocoder may be a STRAIGHT vocoder or a WORLD vocoder, or may be another type of vocoder. In this embodiment of this application, emotional acoustic models corresponding to different emotional intensity parameters of different emotional types are obtained through big data training, the emotional type and the emotional intensity parameter corresponding to the text are extracted, the corresponding target emotional acoustic model is selected from the emotional acoustic models based on the emotional type and the emotional intensity parameter, the text feature is converted into the corresponding acoustic feature using the target emotional acoustic model, and finally the emotional speech data is synthesized. Because the emotional acoustic model is obtained through data training based on different emotional intensity parameters of different emotional types, the acoustic feature obtained using the emotional acoustic model is more accurate, and can be synthesized into speeches of different emotional types and different emotional intensities, improving diversity of synthetic speeches in emotional expressions.

Further, the speech synthesis method in this embodiment of this application uses an emotional strength parameter-based adaptive learning technology such that emotional acoustic models of different emotional intensities can be obtained through training merely using the neutral speech training data and a small amount of emotional speech training data. Since construction costs of the emotional speech training data are higher than that of the neutral speech training data, and the speech synthesis method in this embodiment of this application can reduce an amount of emotional speech training data used, training data construction costs are reduced.

The foregoing describes the solutions provided in the embodiments of this application mainly from a perspective of the speech synthesis apparatus. It can be understood that, to implement the foregoing functions, the speech synthesis apparatus includes corresponding hardware structures and/or software modules for performing the functions. A person of ordinary skill in the art should easily be aware that, in combination with the examples described in the embodiments disclosed in this specification, modules, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of the hardware structure, the speech synthesis apparatus described in FIG. 1 may be implemented by a physical device, or may be jointly implemented by a plurality of physical devices, or may be a logical function module of a physical device. This is not further limited in this embodiment of this application.

Figure 4:
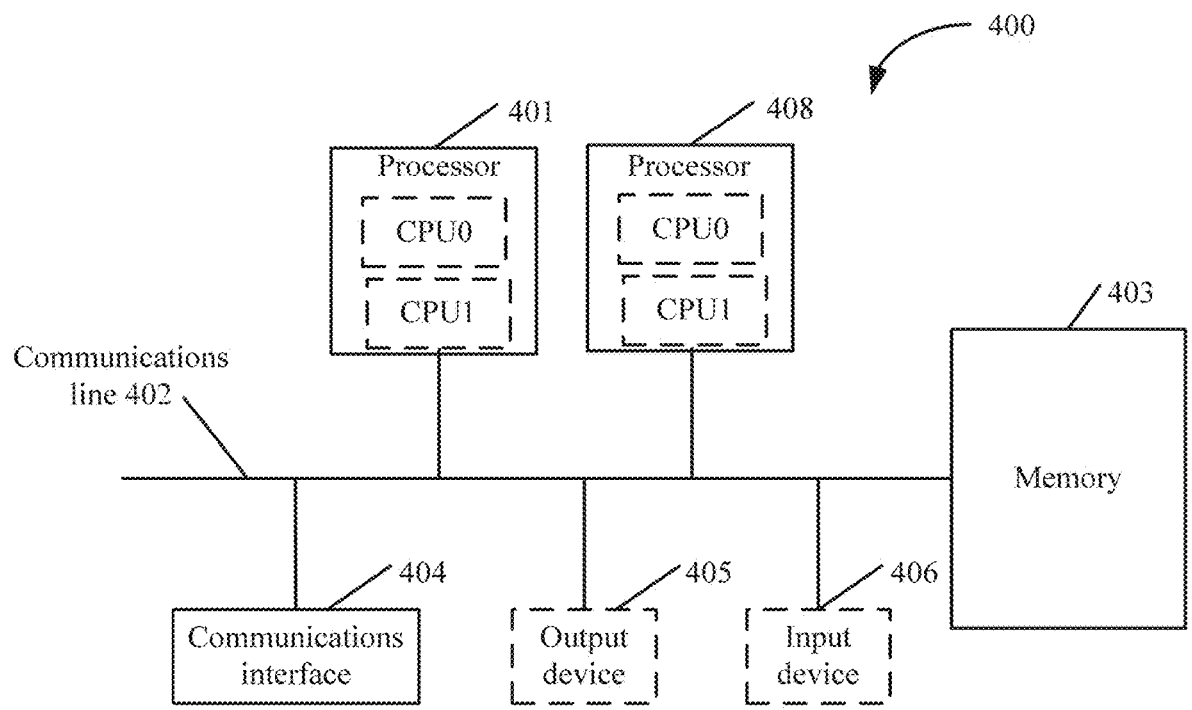
FIG. 4 is a schematic diagram of a hardware structure of a speech synthesis apparatus according to an embodiment of this application.

For example, the speech synthesis apparatus in FIG. 1 may be implemented by the speech synthesis apparatus in FIG. 4. FIG. 4 is a schematic diagram of a hardware structure of a speech synthesis apparatus 400 according to an embodiment of this application.

As shown in FIG. 4, the speech synthesis apparatus 400 includes at least one processor 401, a communications line 402, a memory 403, and at least one communications interface 404.

The processor 401 may be a general central processing unit (CPU), a microprocessor, an application-specific integrated circuit (ASIC), or one or more integrated circuits for controlling program execution of the solutions of this application.

The communications line 402 may include a path for transmitting information between the foregoing components.

The communications interface 404 uses any apparatus like a transceiver to communicate with another device or a communications network, for example, an Ethernet, a radio access network (RAN), or a wireless local area network (WLAN).

The memory 403 may be a read-only memory (ROM), another type of static storage device that can store static information and instructions, a random-access memory (RAM), or another type of dynamic storage device that can store information and instructions, or may be an electrically erasable programmable ROM (EEPROM), a compact disc (CD) ROM (CD-ROM) or another CD storage, an optical disc storage (including a compact optical disc, a laser disc, an optical disc, a digital versatile disc (DVD), a BLU-RAY DISC, or the like), a magnetic disk storage medium or another magnetic storage device, or any other medium that can be used to carry or store expected program code in a form of an instruction or a data structure and that can be accessed by a computer. However, the memory 403 is not limited thereto. The memory 403 may exist independently and be connected to the processor 401 using the communications line 402. Alternatively, the memory 403 may be integrated with the processor 401.

The memory 403 is configured to store computer executable instructions for executing the solutions of this application, and the processor 401 controls execution of the computer executable instructions. The processor 401 is configured to execute the computer executable instructions stored in the memory 403, to implement the speech synthesis method provided in the following embodiment of this application.

Optionally, the computer executable instructions in this embodiment of this application may also be referred to as application program code. This is not limited in this embodiment of this application.

In specific implementation, in an embodiment, the processor 401 may include one or more CPUs, such as CPU0 and CPU1 in FIG. 4.

In specific implementation, in an embodiment, the speech synthesis apparatus 400 may include a plurality of processors, such as the processor 401 and the processor 408 in FIG. 4. Each of these processors 401 and 408 may be a single-core (single-CPU) processor or may be a multi-core (multi-CPU) processor. The processors 401 and 408 herein may be one or more devices, circuits, and/or a processing core for processing data (for example, a computer program instruction).

In specific implementation, in an embodiment, the speech synthesis apparatus 400 may further include an output device 405 and an input device 406. The output device 405 communicates with the processor 401 and can display information in a plurality of ways. For example, the output device 405 may be a liquid crystal display (LCD), a light-emitting diode (LED) display device, a cathode ray tube (CRT) display device, or a projector. The input device 406 communicates with the processor 401 and can receive user input in a plurality of ways. For example, the input device 406 may be a mouse, a keyboard, a touchscreen device, or a sensor device.

The speech synthesis apparatus 400 may be a general-purpose device or a dedicated device. In specific implementation, the speech synthesis apparatus 400 may be a desktop computer, a portable computer, a network server, a personal digital assistant (PDA), a mobile phone, a tablet computer, a wireless terminal device, an embedded device, or a device with a similar structure in FIG. 4. A type of the speech synthesis apparatus 400 is not limited in this embodiment of this application.

In this embodiment of this application, function module division may be performed on a speech synthesis module based on the foregoing method examples. For example, function modules may be obtained through division in correspondence to functions, or at least two functions may be integrated into one processing module. The integrated module may be implemented in a form of hardware, or may be implemented in a form of a software function module. It should be noted that, in this embodiment of this application, module division is an example, and is merely logical function division. In actual implementation, another division manner may be used.

Figure 5:
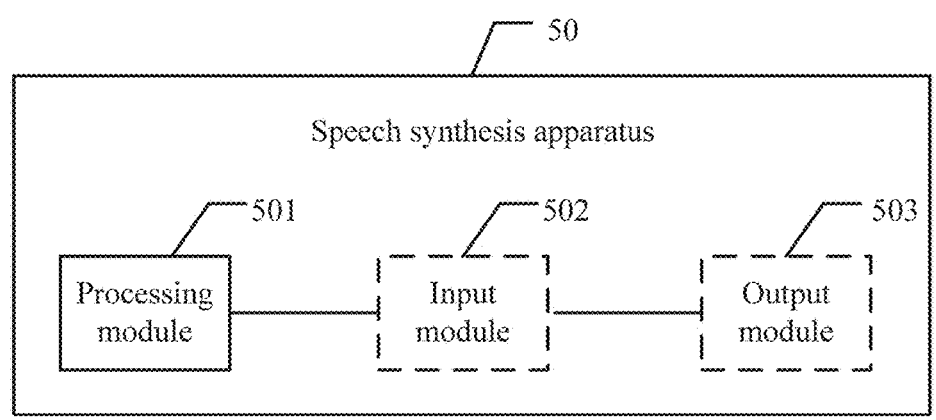
FIG. 5 is a schematic structural diagram of an embodiment of a speech synthesis apparatus according to an embodiment of this application.

For example, when function modules are divided through integration, FIG. 5 is a schematic structural diagram of an embodiment of a speech synthesis apparatus 50 according to an embodiment of this application.

As shown in FIG. 5, the speech synthesis apparatus 50 in this embodiment of this application includes a processing module 501.

The processing module 501 is configured to perform the following operations of obtaining a target emotional type and a target emotional intensity parameter of an input text, where the target emotional intensity parameter is used to represent an emotional intensity corresponding to the target emotional type, obtaining a target emotional acoustic model corresponding to the target emotional type and the target emotional intensity parameter, inputting a text feature of the input text into the target emotional acoustic model to obtain an acoustic feature of the input text, and synthesizing a target emotional speech based on the acoustic feature of the input text.

Optionally, in an example, the processing module 501 is further configured to determine the target emotional type based on an emotional label of the input text, and determine the target emotional intensity parameter based on an emotional intensity requirement corresponding to the input text.

Optionally, in an example, the processing module 501 is further configured to select, from an emotional acoustic model set, an emotional acoustic model corresponding to the target emotional type and the target emotional intensity parameter as the target emotional acoustic model, where the emotional acoustic model set includes a plurality of emotional acoustic models, and the plurality of emotional acoustic models include the target emotional acoustic model.

Optionally, in an example, the processing module 501 is further configured to perform, for different emotional types and different emotional intensity parameters corresponding to the emotional types, model training using a neutral acoustic model and corresponding emotional speech training data to obtain the emotional acoustic model set, where the emotional acoustic model set includes an emotional acoustic model corresponding to each emotional intensity parameter corresponding to each emotion type, the emotional speech training data is data with emotions corresponding to one or more emotional types, and the neutral acoustic model is obtained through model training using neutral speech training data, where the neutral speech training data is data without any emotion corresponding to any emotional type.

Optionally, in an example, an acoustic feature training error corresponding to the emotional speech training data is related to the emotional intensity parameter, where the acoustic feature training error corresponding to the emotional speech training data is used to represent an acoustic feature loss of an acoustic feature predicted using the emotional speech training data during the model training relative to an original acoustic feature of the emotional speech training data.

Optionally, in an example, the acoustic feature training error corresponding to the emotional speech training data is calculated using an error calculation formula, and the error calculation formula is:

$$\text{loss} = 0.5 \times (y2 - \beta^* y1 - (1-\beta)^* y)^2,$$

where loss is the acoustic feature training error corresponding to the emotional speech training data, β is the emotional intensity parameter, y1 is an acoustic feature parameter predicted using the emotional speech training data in the neutral acoustic model, y2 is an acoustic feature parameter predicted using the emotional speech training data in the target emotional acoustic model, and y is an original acoustic feature parameter of the emotional speech training data.

Optionally, in an example, both the neutral acoustic model and the emotional acoustic model may be constructed based on a hidden Markov model or a deep neural network model.

Optionally, in an example, the text feature includes a feature corresponding to at least one of a phoneme, a syllable, a word, or a prosodic phrase that corresponds to the text, and the acoustic feature includes at least one of a fundamental frequency feature, a line spectrum pair feature, an voiceless/voiced sound flag feature, or a spectral envelope feature that corresponds to a sound.

Optionally, in an example, the speech synthesis apparatus 50 may further include an input module 502 and an output module 503, where the input module 502 may be configured to input the input text into the speech synthesis apparatus 50, and the output module 503 may be configured to output the finally synthesized target emotional speech.

All related content of each step in the foregoing method embodiments may be cited in function descriptions of a corresponding function module, and details are not described herein again.

In this embodiment, the speech synthesis apparatus 50 is presented with function modules implemented through integration. The "module" herein may be an ASIC, a circuit, a processor and a memory that execute one or more software or firmware programs, an integrated logic circuit, and/or another device that can provide the foregoing functions. In a simple embodiment, a person skilled in the art can figure out that the speech synthesis apparatus 50 may use the form shown in FIG. 4.

For example, the processor 401 in FIG. 4 can invoke the computer executable instructions stored in the memory 403 such that the speech synthesis apparatus 50 performs the speech synthesis method in the foregoing method embodiments.

Further, functions/implementation processes of the processing module 501, the input module 502, and the output module 503 in FIG. 5 can be implemented by the processor 401 in FIG. 4 by invoking the computer executable instructions stored in the memory 403. Alternatively, a function/implementation process of the processing module 501 in FIG. 5 can be implemented by the processor 401 in FIG. 4 by invoking the computer executable instructions stored in the memory 403, and functions/implementation processes of the input module 502 and the output module 503 in FIG. 5 can be implemented using the communications interface 404 in FIG. 4.

The speech synthesis apparatus provided in this embodiment of this application may be configured to perform the foregoing speech synthesis method. Therefore, for technical effects that can be achieved, refer to the foregoing method embodiments. Details are not described herein again.

In the foregoing embodiments, the speech synthesis apparatus is presented with function modules implemented through integration. Certainly, in the embodiments of this application, function modules of an enforcement function network element and a control function network element may be obtained through division in correspondence to functions. This is not limited in this embodiment of this application.

Optionally, an embodiment of this application provides a chip system. The chip system includes a processor configured to support a user plane function entity in implementing the foregoing speech synthesis method. In a possible design, the chip system further includes a memory, where the memory is configured to store program instructions and data that are necessary for storing an enforcement function network element and a control function network element. The chip system may include a chip, or may include a chip and another discrete device. This is not limited in this embodiment of this application.

All or some of the foregoing embodiments may be implemented using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, DVD), a semiconductor medium (for example, a solid-state drive (SSD)), or the like.

A person of ordinary skill in the art may understand that all or some of the steps of the methods in the embodiments may be implemented by a program instructing relevant hardware. The program may be stored in a computer readable storage medium. The storage medium may include a ROM, a RAM, a magnetic disk, an optical disc, or the like.

The speech synthesis method and the speech synthesis apparatus provided in the embodiments of this application are described in detail above. The principle and implementation of this application are described herein through specific examples. The description about the embodiments of this application is merely provided to help understand the method and core ideas of this application. In addition, a person of ordinary skill in the art can make variations and modifications to this application in terms of the specific implementations and application scopes according to the ideas of this application. Therefore, the content of specification shall not be construed as a limit to this application.

What is claimed is:

1. A speech synthesis method comprising:
    obtaining a target emotional type and a target emotional intensity parameter of an input text, wherein the target emotional intensity parameter represents an emotional intensity corresponding to the target emotional type;
    obtaining a target emotional acoustic model corresponding to the target emotional type and the target emotional intensity parameter;
    inputting a text feature of the input text into the target emotional acoustic model to obtain a first acoustic feature of the input text; and
    synthesizing a target emotional speech based on the first acoustic feature, wherein before obtaining the target emotional acoustic model, the speech synthesis method further comprises:
        obtaining a neutral acoustic model through a first model training using neutral speech training data;
        performing, for different emotional types and different emotional intensity parameters of the different emotional types, a second model training using the neutral acoustic model and corresponding emotional speech training data to obtain an emotional acoustic model set comprising the target emotional acoustic model; and
        predicting a second acoustic feature using the emotional speech training data, wherein an acoustic feature training error corresponding to the emotional speech training data relates to the emotional intensity parameter, and wherein the acoustic feature training error represents an acoustic feature loss of the second acoustic feature during a third model training relative to an original acoustic feature of the emotional speech training data.

2. The speech synthesis method of claim 1, further comprising:
    obtaining the target emotional type based on an emotional label of the input text; and
    obtaining the target emotional intensity parameter based on an emotional intensity requirement corresponding to the input text.

3. The speech synthesis method of claim 1, further comprising selecting, from the emotional acoustic model set, the target emotional acoustic model corresponding to the target emotional type and the target emotional intensity parameter, wherein the emotional acoustic model set comprises a plurality of emotional acoustic models.

4. The speech synthesis method of claim 1, wherein the neutral speech training data does not comprise an emotion, and wherein the emotional speech training data comprises emotions corresponding to one or more emotional types.

5. The speech synthesis method of claim 1, further comprising:
    predicting a first acoustic feature parameter using the emotional speech training data in the neutral acoustic model;
    predicting a second acoustic feature parameter using the emotional speech training data in the target emotional acoustic model; and
    calculating the acoustic feature training error using an error calculation formula, wherein the error calculation formula is:

$$\text{loss} = 0.5 \times (y2 - \beta^* y1 - (1-\beta)^* y)^2,$$

wherein loss is the acoustic feature training error, wherein $\beta$ is the emotional intensity parameter, wherein $y1$ is the first acoustic feature parameter, wherein $y2$ is the second acoustic feature parameter, and wherein $y$ is the original acoustic feature parameter of the emotional speech training data.

6. The speech synthesis method of claim 1, further comprising constructing both the neutral acoustic model and the emotional acoustic model based on a hidden Markov model or a deep neural network model.

7. A speech synthesis apparatus, comprising:
a memory configured to store programming instructions; and
a processor coupled to the memory, wherein the programming instructions cause the processor to be configured to:
  obtain a target emotional type and a target emotional intensity parameter of an input text, wherein the target emotional intensity parameter represents an emotional intensity corresponding to the target emotional type;
  obtain a target emotional acoustic model corresponding to the target emotional type and the target emotional intensity parameter;
  input a text feature of the input text into the target emotional acoustic model to obtain a first acoustic feature of the input text; and
  synthesize a target emotional speech based on the first acoustic feature, wherein in a manner to obtain the target emotional acoustic model, the programming instructions cause the processor to be configured to:
    obtain a neutral acoustic model through a first model training using neutral speech training data;
    perform, for different emotional types and different emotional intensity parameters of the different emotional types, a second model training using the neutral acoustic model and corresponding emotional speech training data to obtain an emotional acoustic model set comprising the target emotional acoustic model; and
    predict a second acoustic feature using the emotional speech training data, wherein an acoustic feature training error corresponding to the emotional speech training data relates to the emotional intensity parameter, and wherein the acoustic feature training error represents an acoustic feature loss of the second acoustic feature during a third model training relative to an original acoustic feature of the emotional speech training data.

8. The speech synthesis apparatus of claim 7, wherein the programming instructions further cause the processor to be configured to:
  determine the target emotional type based on an emotional label of the input text; and
  determine the target emotional intensity parameter based on an emotional intensity requirement corresponding to the input text.

9. The speech synthesis apparatus of claim 7, wherein the programming instructions further cause the processor to be configured to select, from the emotional acoustic model set, the target emotional acoustic model corresponding to the target emotional type and the target emotional intensity parameter, and wherein the emotional acoustic model set comprises a plurality of emotional acoustic models.

10. The speech synthesis apparatus of claim 7, wherein the neutral speech training data does not comprise an emotion,
and wherein the emotional speech training data comprises emotions corresponding to one or more emotional types.

11. The speech synthesis apparatus of claim 7, wherein the programming instructions further cause the processor to be configured to:
  predict a first acoustic feature parameter using the emotional speech training data in the neutral acoustic model;
  predict a second acoustic feature parameter using the emotional speech training data in the target emotional acoustic model; and
  calculate the acoustic feature training error using an error calculation formula, wherein the error calculation formula is:

$$\mathrm{loss}=0.5\times(y2-\beta^*y1-(1-\beta)^*y)^2,$$

wherein loss is the acoustic feature training error, wherein $\beta$ is the emotional intensity parameter, wherein y1 is the first acoustic feature parameter, wherein y2 is the second acoustic feature parameter, and wherein y is the original acoustic feature parameter of the emotional speech training data.

12. The speech synthesis apparatus of claim 7, wherein the programming instructions further cause the processor to be configured to construct both the neutral acoustic model and the emotional acoustic model based on a hidden Markov model or a deep neural network model.

13. A computer program product comprising computer-executable instructions for storage on a non-transitory computer-readable storage medium that, when executed by a processor, cause a computer to:
  obtain a target emotional type and a target emotional intensity parameter of an input text, wherein the target emotional intensity parameter represents an emotional intensity corresponding to the target emotional type;
  obtain a target emotional acoustic model corresponding to the target emotional type and the target emotional intensity parameter;
  input a text feature of the input text into the target emotional acoustic model to obtain a first acoustic feature of the input text; and
  synthesize a target emotional speech based on the first acoustic feature, wherein in a manner to obtain the target emotional acoustic model, the computer-executable instructions further cause the computer to:
    obtain a neutral acoustic model through a first model training using neutral speech training data;
    perform, for different emotional types and different emotional intensity parameters of the different emotional types, a second model training using the neutral acoustic model and corresponding emotional speech training data to obtain an emotional acoustic model set comprising the target emotional acoustic model; and
    predict a second acoustic feature using the emotional speech training data, wherein an acoustic feature training error corresponding to the emotional speech training data relates to the emotional intensity parameter, and wherein the acoustic feature training error represents an acoustic feature loss of the second acoustic feature during a third model training relative to an original acoustic feature of the emotional speech training data.

14. The computer program product of claim 13, wherein the computer-executable instructions further cause the computer to:
  determine the target emotional type based on an emotional label of the input text; and
  determine the target emotional intensity parameter based on an emotional intensity requirement corresponding to the input text.

15. The computer program product of claim 13, wherein the computer-executable instructions further cause the computer to select, from the emotional acoustic model set, the target emotional acoustic model corresponding to the target emotional type and the target emotional intensity parameter, and wherein the emotional acoustic model set comprises a plurality of emotional acoustic models.

16. The computer program product of claim 13, wherein the neutral speech training data does not comprise an emotion,
and wherein the emotional speech training data is data with emotions corresponding to one or more emotional types.

17. The computer program product of claim 13, wherein the computer-executable instructions further cause the computer to:
predict a first acoustic feature parameter using the emotional speech training data in the neutral acoustic model;
predict a second acoustic feature parameter using the emotional speech training data in the target emotional acoustic model; and
calculate the acoustic feature training error using an error calculation formula, wherein the error calculation formula is:

$$loss=0.5\times(y2-\beta*y1-(1-\beta)*y)^2,$$

wherein loss is the acoustic feature training error, wherein $\beta$ is the emotional intensity parameter, wherein y1 is the first acoustic feature parameter, wherein y2 is the second acoustic feature parameter, and wherein y is the original acoustic feature parameter of the emotional speech training data.

18. The computer program product of claim 13, wherein the computer-executable instructions further cause the computer to update the target emotional acoustic model based on the acoustic feature training error.

19. The speech synthesis method of claim 1, further comprising updating the target emotional acoustic model based on the acoustic feature training error.

20. The speech synthesis apparatus of claim 7, wherein the programming instructions further cause the processor to be configured to update the target emotional acoustic model based on the acoustic feature training error.

* * * * *